United States Patent
Kim

(10) Patent No.: US 12,427,959 B2
(45) Date of Patent: Sep. 30, 2025

(54) VEHICLE BRAKING SYSTEM AND CONTROL METHOD OF THE SAME

(71) Applicant: HL MANDO Corporation, Pyeongtaek-si (KR)

(72) Inventor: Taeho Kim, Yongin-si (KR)

(73) Assignee: HL Mando Corporation, Pyeongtaek (KR)

( * ) Notice: Subject to any disclaimer, the term of this patent is extended or adjusted under 35 U.S.C. 154(b) by 431 days.

(21) Appl. No.: 17/971,913

(22) Filed: Oct. 24, 2022

(65) Prior Publication Data

US 2023/0130383 A1 Apr. 27, 2023

(30) Foreign Application Priority Data

Oct. 27, 2021 (KR) .................. 10-2021-0144532

(51) Int. Cl.
  *B60T 8/88* (2006.01)
  *B60T 7/12* (2006.01)
  *B60T 8/94* (2006.01)
  *B60T 13/68* (2006.01)
  *B60T 17/22* (2006.01)

(52) U.S. Cl.
  CPC ............... *B60T 8/885* (2013.01); *B60T 7/12* (2013.01); *B60T 8/94* (2013.01); *B60T 13/686* (2013.01); *B60T 17/22* (2013.01); *B60T 2270/402* (2013.01); *B60T 2270/413* (2013.01); *B60T 2270/88* (2013.01)

(58) Field of Classification Search
  CPC ..... B60T 8/00; B60T 8/94; B60T 8/96; B60T 8/885; B60T 13/686; B60T 17/22
  See application file for complete search history.

(56) References Cited

U.S. PATENT DOCUMENTS

| | | | | |
|---|---|---|---|---|
| 5,457,363 | A * | 10/1995 | Yoshii | B60L 15/2009 318/432 |
| 11,590,945 | B2 * | 2/2023 | Einig | B60T 13/686 |
| 12,151,660 | B2 * | 11/2024 | Vollert | B60T 13/662 |

(Continued)

FOREIGN PATENT DOCUMENTS

| | | |
|---|---|---|
| DE | 23 42 307 A1 | 8/1973 |
| DE | 41 32 767 A1 | 10/1991 |

(Continued)

OTHER PUBLICATIONS

Office Action issued May 22, 2023 for corresponding Korean Patent Application No. 10-2021-0144532 (See English Translation).

*Primary Examiner* — John Kwon

(74) *Attorney, Agent, or Firm* — Harvest IP Law, LLP

(57) ABSTRACT

Disclosed are a vehicle braking system and a control method thereof, which are a vehicle braking system capable of detecting an offset of a pressure sensor regardless of whether a brake pedal is provided, and a control method thereof, including a first brake device, a first pressure sensor for measuring an internal pressure of the first brake device; and a first offset determinator for determining that an offset has occurred in the first pressure sensor when a first cut valve provided in the first brake device is opened and the state in which a measurement of the first pressure sensor exceeds a first reference pressure is maintained for more than a first reference time.

16 Claims, 11 Drawing Sheets

(56) References Cited

U.S. PATENT DOCUMENTS

| | | | |
|---|---|---|---|
| 2007/0210647 A1* | 9/2007 | Miyazaki | B60T 13/662 |
| | | | 303/155 |
| 2016/0288596 A1* | 10/2016 | LeMense | B60C 23/0459 |
| 2016/0311422 A1* | 10/2016 | van Zanten | G01M 3/2869 |
| 2021/0070267 A1* | 3/2021 | Weh | B60T 8/4081 |

FOREIGN PATENT DOCUMENTS

| | | |
|---|---|---|
| DE | 10 2009 053 815 A1 | 5/2011 |
| JP | 2017-136896 A | 8/2017 |
| KR | 2015-0046867 A | 5/2015 |
| KR | 2016-0081467 A | 7/2016 |
| KR | 10-2019-0101131 A | 8/2019 |
| KR | 10-2020-0118176 A | 10/2020 |

* cited by examiner

VEHICLE BRAKING SYSTEM AND CONTROL METHOD OF THE SAME

CROSS-REFERENCE TO RELATED APPLICATION

This application claims priority to and the benefit of Korean Patent Application No. 10-2021-0144532, filed on Oct. 27, 2021, the disclosure of which is incorporated herein by reference in its entirety.

TECHNICAL FIELD

The present disclosure relates to a vehicle braking system and a control method thereof, and more specifically to a vehicle braking system capable of detecting an offset of a pressure sensor in a braking system for a fully autonomous vehicle and a control method thereof.

BACKGROUND ART

The vehicle braking system refers to a system for decelerating or stopping the speed of a driving vehicle. A typical vehicle braking system permits or restricts the rotation of wheel cylinders by controlling a brake hydraulic pressure transmitted to the wheel cylinders of the wheel.

In order to set the target braking pressure at the time of pressure regulation, the vehicle braking system requires a pressure sensor. If an offset occurs in the pressure sensor and a pressure greater than the actual pressure is input to the pressure sensor, the target braking pressure is set to be smaller than the actual target braking pressure, and an error may occur in the normal operation of the vehicle braking system.

The conventional vehicle braking system determines that an offset has occurred in the pressure sensor when the pressure sensor measurement value is greater than or equal to a predetermined value in the pressure non-controlled state and the non-braking state of the brake pedal. However, in a fully autonomous vehicle in which the brake pedal does not exist, it is impossible to determine the braking and non-braking states of the brake pedal. Accordingly, in a fully autonomous vehicle, it is impossible to detect the offset of the pressure sensor in the same way as before.

Accordingly, the development of a method for detecting an offset of a pressure sensor that can be applied to a braking system for a fully autonomous vehicle may be considered.

Korean Registered Patent No. 10-1656961 discloses a method for diagnosing a failure of a vehicle pressure sensor, Specifically, the method for diagnosing a pressure sensor failure of a vehicle for diagnosing and warning a pressure sensor failure of a pneumatic automatic manual transmission vehicle is disclosed. However, this type of failure diagnosis method can be implemented only in a state where the parking brake of a vehicle is engaged and the shift stage is in neutral, and thus, it is difficult to be applied to the braking system for a fully autonomous vehicle which does not include components corresponding brake engagement and shift stage.

Korean Patent Application No. 10-2015-0046867 discloses a method for resetting a master cylinder pressure offset value of a vehicle brake. Specifically, it discloses a method for resetting the master cylinder pressure offset value, which allows the offset value to be set even when the brake pedal switch fails.

However, this type of pressure offset value resetting method requires a master cylinder pressure value in a state where the brake pedal is depressed and the engine is turned on. That is, it is premised on the existence of a brake pedal. Therefore, there is a limitation in being applied to a braking system for a fully autonomous vehicle in which there is no brake pedal.

(Patent Document 1) Korean Registered Patent No. 10-11656961 (Sep. 12, 2016)
(Patent Document 2) Korean Patent Application No. 10-2015-0046867 (May 4, 2015)

DISCLOSURE

Technical Problem

An object of the present disclosure is to provide a vehicle braking system which is capable of detecting an offset of a pressure sensor regardless of whether a brake pedal is provided, and a control method thereof.

Another object of the present disclosure is to provide a vehicle braking system with improved offset detection performance and reliability of a pressure sensor, and a control method thereof.

Still another object of the present disclosure is to provide a vehicle braking system which is capable of normal braking even when some brake devices fail, and a control method thereof.

Technical Solution

In order to achieve the above objects, the vehicle braking system according to an exemplary embodiment of the present disclosure is a braking system for a fully autonomous vehicle, including a first brake device including a first cut valve for controlling a brake hydraulic pressure transmitted to a wheel cylinder; a first pressure sensor for measuring an internal pressure of the first brake device; and a first offset determinator for determining that an offset has occurred in the first pressure sensor when the first cut valve is opened and the state in which a measurement of the first pressure sensor exceeds a first reference pressure is maintained for more than a first reference time.

In addition, the vehicle braking system may further include an offset response device for transmitting an instruction and a control signal for offset response to the first brake device when the first offset determinator determines that an offset of the first pressure sensor has occurred.

In addition, the offset response device may include a feedback pressure calculator for calculating a feedback pressure of the first brake device based on an estimated internal pressure of the first brake device, after the first offset determinator determines that an offset of the first pressure sensor has occurred.

In addition, the feedback pressure calculator may calculate a feedback pressure of the first brake device based on an internal pressure of the first brake device estimated by a motor position sensor.

In addition, the vehicle braking system may further include a second brake device including a second cut valve for controlling a brake hydraulic pressure transmitted to a wheel cylinder, and performing vehicle braking when the normal operation of the motor position sensor is impossible.

In addition, the vehicle braking system may further include a second brake device including a second cut valve for controlling a brake hydraulic pressure transmitted to a wheel cylinder, and performing vehicle braking when an offset of the first pressure sensor occurs in the first offset determinator.

In addition, the vehicle braking system may further include a second brake device including a second cut valve for controlling a brake hydraulic pressure transmitted to a wheel cylinder; a second pressure sensor for measuring an internal pressure of the second brake device; and a second offset determinator for determining whether an offset of the second pressure sensor has occurred.

In addition, the second brake device may open the second relay valve to remove a residual pressure, when the second cut valve is opened and the state in which a measurement of the second pressure sensor exceeds a second reference pressure is maintained for more than a second reference time, and wherein the second offset determinator may determine whether an offset of the second pressure sensor has occurred after the residual pressure of the second brake device is removed.

In addition, the second offset determinator may determine that an offset has occurred in the second pressure sensor when the residual pressure of the second brake device is removed for a third reference time, and then the state in which a measurement of the second pressure sensor exceeds a fourth reference pressure is maintained for more than a fourth reference time.

In addition, the second reference pressure and the fourth reference pressure may be formed to be the same.

In addition, the second reference time and the fourth reference time may be formed to be the same.

In addition, the vehicle braking system may further include a fall-back conversion device for converting the second pressure sensor to a fall-back state and outputs to the outside, after the second offset determinator determines that an offset has occurred in the second pressure sensor.

In addition, the present disclosure provides a method for controlling a vehicle braking system which is a method for controlling a braking system for a fully autonomous vehicle, including the steps of (a) measuring an internal pressure of a first brake device by a first pressure sensor; (b) determining by a first offset determinator that an offset has occurred in the first pressure sensor when a first cut valve of the first pressure sensor is opened and the state in which a measurement of the first pressure sensor exceeds a first reference pressure is maintained for more than a first reference time; and (c) performing vehicle braking by the second brake device.

In addition, before step (c), (c0) calculating a feedback pressure of the first brake device based on an internal pressure of the first brake device estimated by a feedback pressure calculator from a motor position sensor may be performed, and wherein in step (c0), if the normal operation of the motor position sensor is impossible, step (c) may be performed immediately.

In addition, the method may further include the steps of (d) determining by a second offset determinator that an offset has occurred in a second pressure sensor; and (e) converting the second pressure sensor to a fall-back state by a fall-back conversion device, after step (c).

In addition, step (d) may include the steps of (d1) opening a second cut valve of the second pressure sensor and maintaining the state in which a measurement of the second pressure sensor exceeds a second reference pressure for more than a second reference time; (d2) removing a residual pressure of the second brake device for a third reference time; and (d3) determining by the second offset determinator that an offset has occurred in the second pressure sensor, when the second cut valve is opened and the state in which a measurement of the second pressure sensor exceeds a fourth reference pressure is maintained for more than a fourth reference time.

Advantageous Effects

Among the various effects of the present disclosure, the effects that can be obtained through the above-described technical solution are as follows.

First, the vehicle braking system according to the present disclosure is a braking system for a fully autonomous vehicle, and includes a brake device, a pressure sensor for measuring the internal pressure of the brake device and an offset determinator for determining whether an offset occurs in the pressure sensor.

The offset determinator determines that an offset has occurred in the pressure sensor when the state in which a measurement of the pressure sensor exceeds a reference pressure is maintained for more than a reference time when the cut valve provided in the brake device is opened. That is, it is not required whether the brake pedal is braked when determining the occurrence of an offset.

Accordingly, the offset of the pressure sensor may be detected regardless of whether the brake pedal is provided.

In addition, the brake device includes a first brake device and a second brake device. Since the second brake device is formed in a closed circuit structure, additional pressure may be generated when the motor is abnormally driven.

In consideration of this point, the second offset determinator for determining whether an offset occurs when measuring the internal pressure of the second brake device removes the residual pressure of the second brake device when an offset is suspected, and then measures the pressure of the second brake device again to determine whether an offset has occurred.

Accordingly, the offset detection performance of the pressure sensor may be further improved. Furthermore, the offset detection reliability may be further increased.

In addition, the brake device includes a first brake device and a second brake device for assisting the failure of the first brake device. When an offset occurs in the first brake device, the second brake device may perform vehicle braking in place of the first brake device.

Accordingly, even when the normal operation of the first brake device is difficult, braking by the second brake device is possible. That is, normal braking of the vehicle is possible even when some brake devices fail.

MODES OF THE INVENTION

Figure 1:
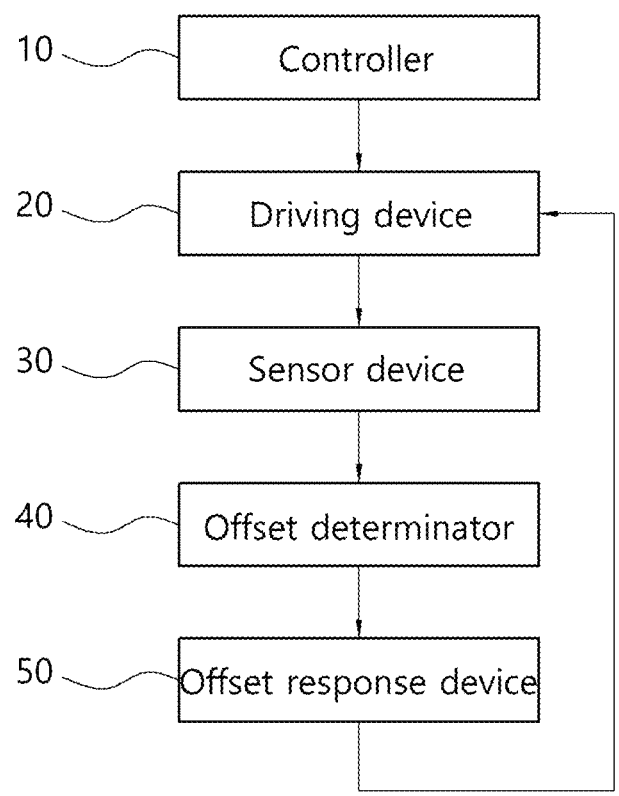
FIG. 1 is a schematic diagram illustrating the vehicle braking system according to an exemplary embodiment of the present disclosure.
Figure 2:
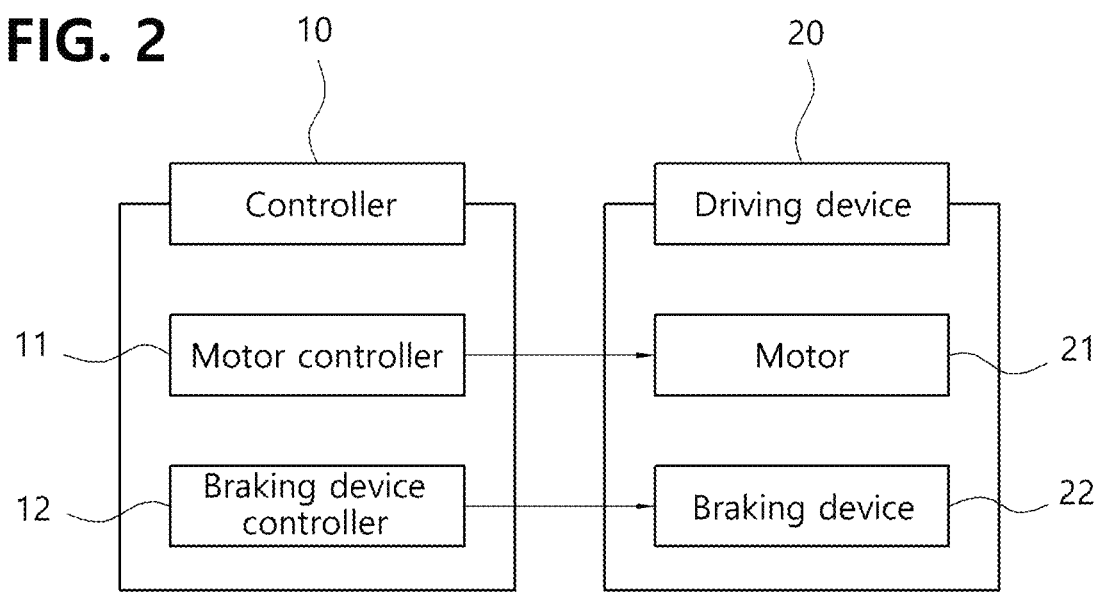
FIG. 2 is a schematic diagram illustrating a controller and a driving device provided in the vehicle braking system of FIG. 1.
Figure 3:
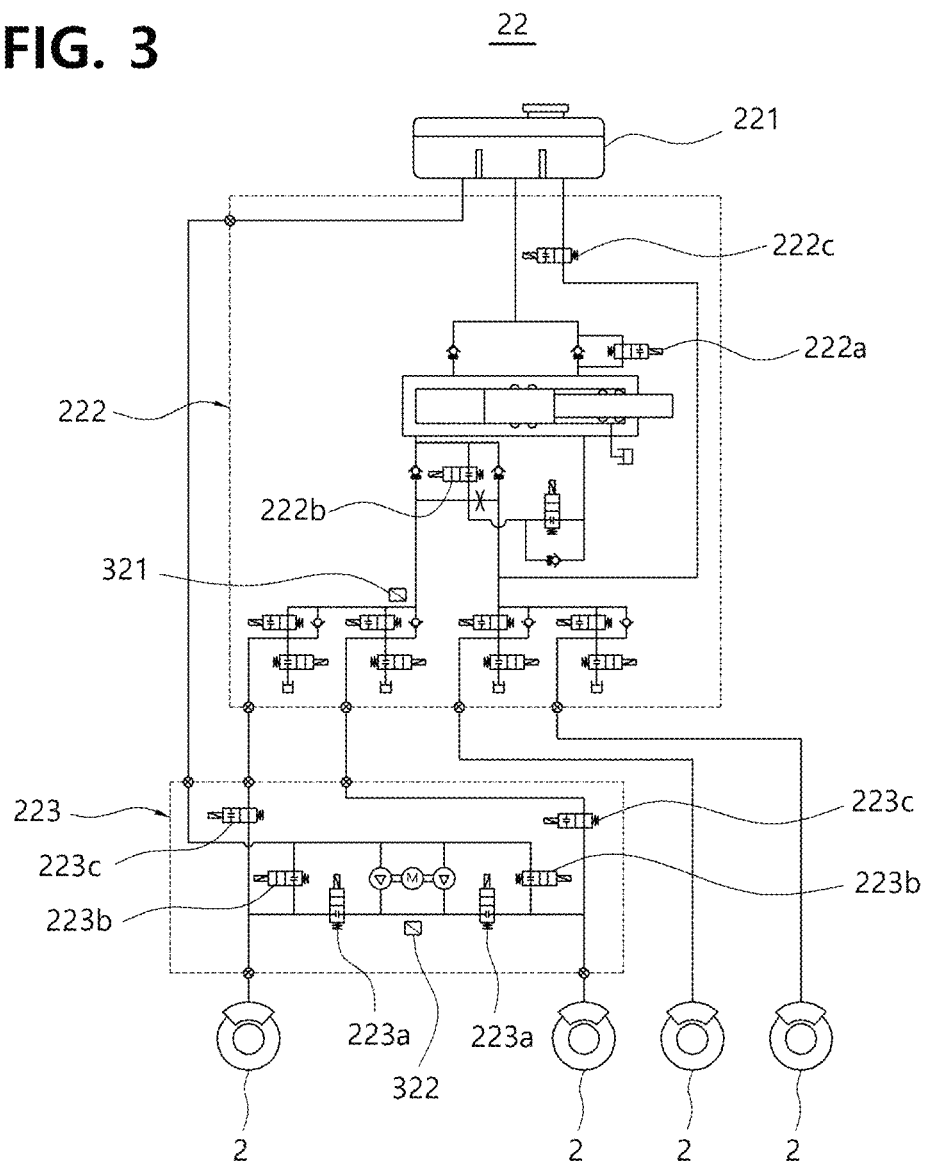
FIG. 3 is a schematic diagram illustrating a braking device provided in the driving device of FIG. 2.
Figure 4:
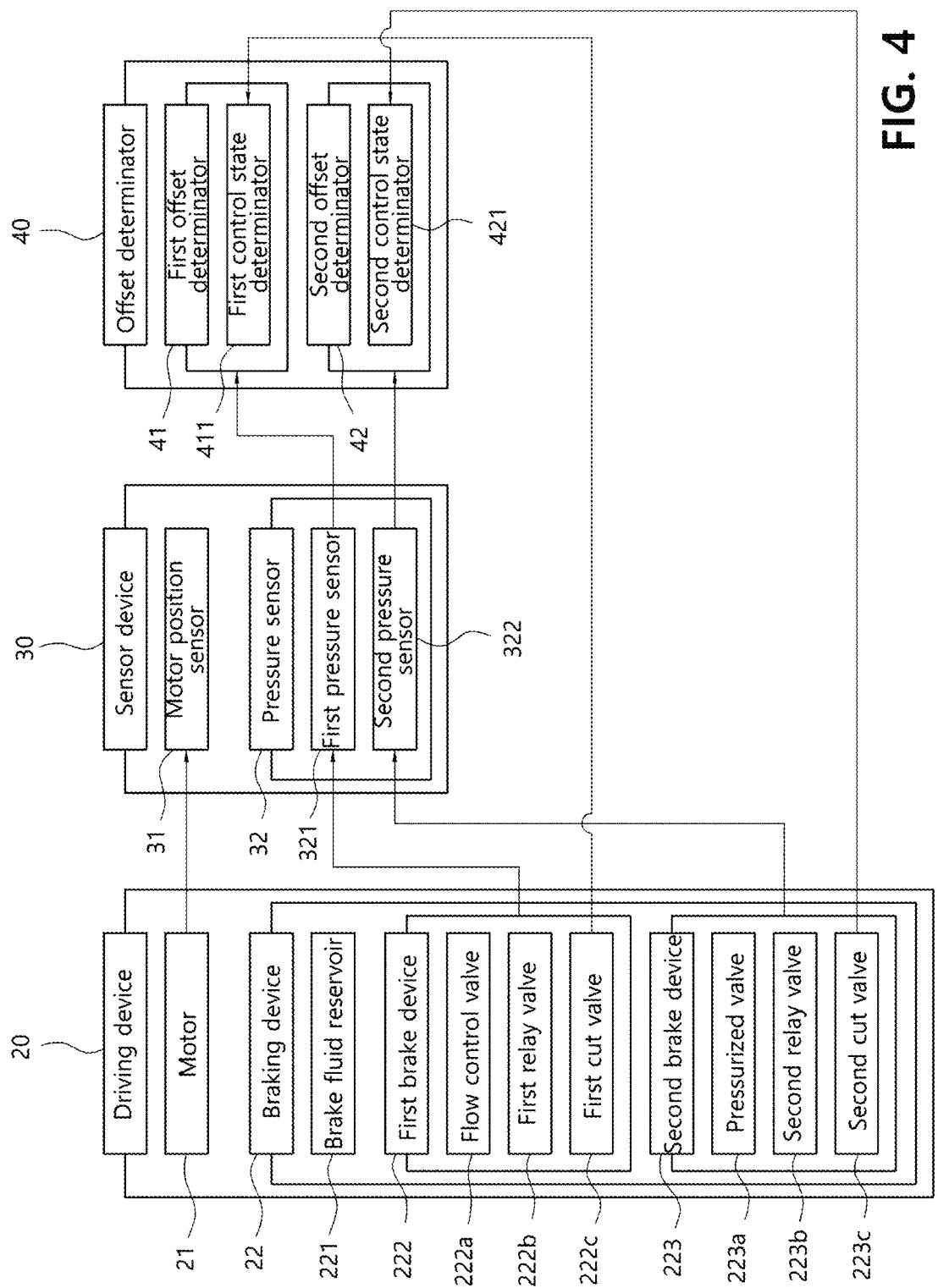
FIG. 4 is a schematic diagram illustrating a driving device, a sensor device and an offset determinator provided in the vehicle braking system of FIG. 1.
Figure 5:
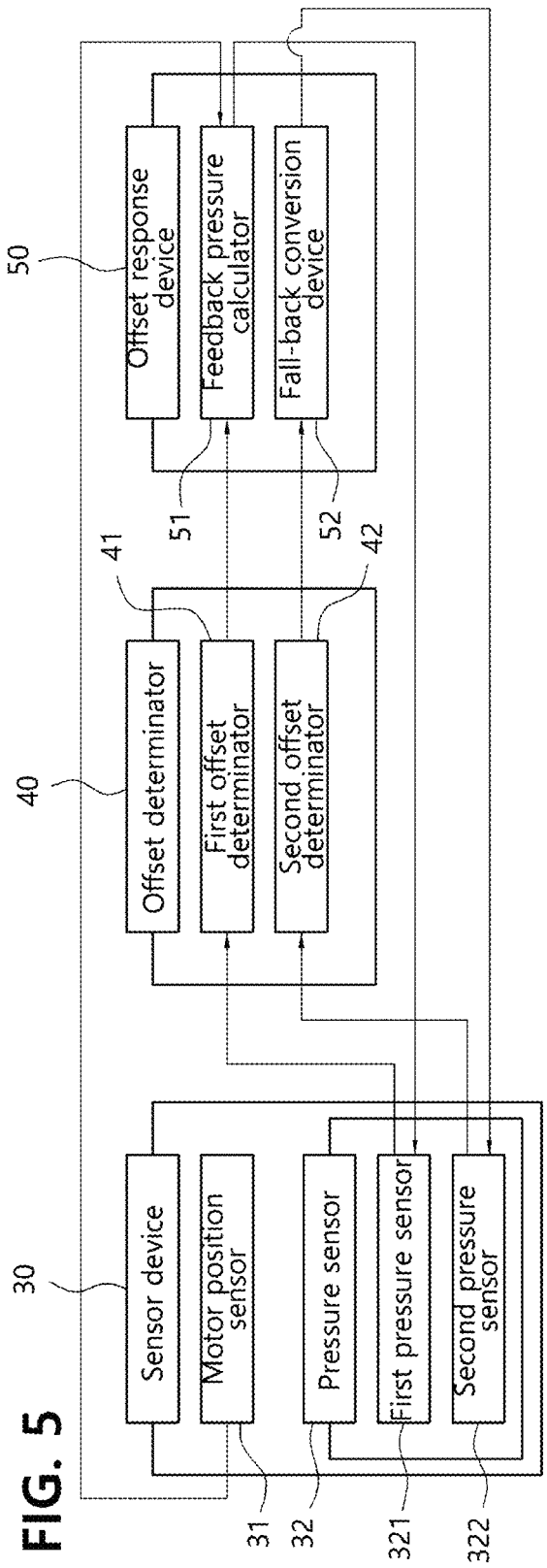
FIG. 5 is a schematic diagram illustrating a sensor device, an offset determinator and an offset response device provided in the vehicle braking system of FIG. 1.

Hereinafter, the method for controlling a vehicle braking system 1 according to an exemplary embodiment of the present disclosure will be described in more detail with reference to the drawings.

In the following description, in order to clarify the characteristics of the present disclosure, the descriptions of some components may be omitted.

In the present specification, the same reference numerals are assigned to the same components even in different exemplary embodiments, and the overlapping descriptions thereof will be omitted.

The accompanying drawings are only for easy understanding of the exemplary embodiments disclosed in the present specification, and the technical ideas disclosed in the present specification are not limited by the accompanying drawings.

The singular expression includes the plural expression unless the context clearly dictates otherwise.

Hereinafter, the vehicle braking system 1 according to an exemplary embodiment of the present disclosure will be described with reference to FIGS. 1 to 5.

The vehicle braking system 1 according to the present disclosure is a system for decelerating or stopping the speed of a vehicle in motion, and more particularly relates to a braking system for a fully autonomous vehicle in which a brake pedal may be omitted.

The vehicle braking system 1 allows or limits the rotation of wheel cylinders by controlling a brake hydraulic pressure transmitted to the wheel cylinders of the wheels 2. In this case, in order to set the target braking pressure at the time of pressure adjustment, the current pressure needs to be measured. The detailed description thereof will be provided below.

The vehicle braking system 1 includes a controller 10, a driving device 20, a sensor device 30, an offset determinator 40 and an offset response device 50.

The controller 10 controls each component of the driving device 20. To this end, the controller 10 is electrically connected to the driving device 20.

In the illustrated exemplary embodiment, the controller 10 includes a motor controller 11 and a braking device controller 12, and the driving device 20 includes a motor 21 and a braking device 22. In addition, the motor controller 11 and the braking device controller 12 are electrically connected to the motor 21 and the braking device 22, respectively.

The motor controller 11 and the brake device controller 12 control the motor 21 and the brake device 22, respectively, such that the vehicle may travel at a target speed. The motor controller 11 and the brake system controller 12 compare the current speed and the target speed of the vehicle, and accelerate or decelerate the speed of the vehicle.

In this case, the braking device 22 may reduce the traveling speed of the vehicle by allowing or limiting the rotation of the wheels 2 of the vehicle.

The brake device 22 controls a brake hydraulic pressure transmitted to the wheel cylinders. Accordingly, the reciprocating movement of the wheel cylinder may be induced. As a result, it is possible to allow or limit the rotation of the vehicle wheels 2.

The braking device 22 includes a brake fluid reservoir 221, a first brake device 222 and a second brake device 223.

The brake fluid reservoir 221 has a space formed therein in which the brake fluid is accommodated.

The first brake device 222 primarily controls the amount of brake fluid supplied to the wheel cylinders.

The first brake device 222 is connected to the brake fluid reservoir 221 to receive the brake fluid from the brake fluid reservoir 221. In this case, the required internal pressure of the first brake device 222 may be changed according to the target brake fluid supply amount of the first brake device 222.

The internal pressure of the first brake device 222 may be determined according to the open/closed state of a flow control valve 222a, a first relay valve 222b and a first cut valve 222c provided in the first brake device 222.

For example, when the first cut valve 222c is opened, all of the pressure is moved to the brake fluid reservoir 221 even when the pressure generator is operated, and thus, the internal pressure of the first brake device 222 does not exceed a certain pressure.

Whether or not the first cut valve 222c is opened may be determined by measuring the energization current of the first cut valve 222c. When the first cut valve 222c is opened, the current flowing through the first cut valve 222c does not exceed a predetermined current value. In an exemplary embodiment, the energization current of the first cut valve 222c does not exceed 100 mA when the first cut valve 222c is opened.

When the normal operation of the first brake device 222 is difficult, vehicle braking may be performed by the second brake device 223.

The second brake device 223 assists in regulating the amount of brake fluid supplied to the wheel cylinders of the first brake device 222. Accordingly, normal braking of the vehicle is possible even when the first brake device 222 fails.

In the illustrated exemplary embodiment, the second brake device 223 is formed as a redundancy circuit with respect to the first brake device 222.

The second brake device 223 is connected to the brake fluid reservoir 221 and the first brake device 222 to receive brake fluid from at least one of the brake fluid reservoir 221 and the first brake device 222. In this case, the required internal pressure of the second brake device 223 may be changed according to the target brake fluid supply amount of the second brake device 223.

In the illustrated exemplary embodiment, the second brake device 223 includes an apply valve 223a, a second relay valve 223b and a second cut valve 223c which are formed of a normally closed valve (NC valve). The internal pressure of the second brake device 223 may be determined according to the open/closed states of the pressure valve 223a, the second relay valve 223b and the second cut valve 223c.

For example, when the second cut valve 223c is opened, all of the pressure is moved to the brake fluid reservoir 221 even when the pressure generator is operated, and thus, the internal pressure of the second brake device 223 does not exceed a certain pressure.

Whether or not the second cut valve 223c is opened may be determined by measuring the current through the second cut valve 223c. When the second cut valve 223c is opened, the current flowing through the second cut valve 223c does not exceed a predetermined current value. In an exemplary embodiment, the energization current of the second cut valve 223c does not exceed 100 mA when the second cut valve 223c is opened.

Data regarding the operating state of the driving device 20 is collected by the sensor device 30. To this end, the sensor device 30 is electrically connected to the motor 21 and the braking device 22.

In the illustrated exemplary embodiment, the sensor device 30 includes a motor position sensor (MPS) 31 and a pressure sensor 32.

The motor position sensor 31 collects data regarding the operating state of the motor 21. In particular, data on the operating state of the motor 21 responsible for pressure generation is collected. To this end, the motor position sensor 31 is electrically connected to the motor 21.

The pressure sensor 32 collects pressure data of the braking device 22.

The pressure sensor 32 provides current pressure data necessary for calculating the target braking pressure when the pressure of the braking device 22 is adjusted. If an offset is generated in the pressure sensor 32 and a pressure greater than the actual pressure is input to the pressure sensor 32, the target braking pressure is set to be smaller than the actual target braking pressure such that errors may occur in the normal operation of the vehicle braking system 1.

The pressure sensor 32 includes a first pressure sensor 321 and a second pressure sensor 322. The first pressure sensor 321 and the second pressure sensor 322 are electrically connected to the first brake device 222 and the second brake device 223 so as to measure the internal pressures of the first brake device 222 and the second brake device 222, respectively.

Although the first pressure sensor 321 and the second pressure sensor 322 have similar structures and functions, there are differences in some structures.

In the first pressure sensor 321, when the first cut valve 222c is opened in a state where the pressure control of the first brake device 222 is in an OFF state, abnormal pressure is less likely to be formed. This is due to the fact that pressure is transferred to the brake fluid reservoir 221 as the first cut valve 222c is opened in a state where the pressure control of the first brake device 222 is in an OFF state.

The second pressure sensor 322 is formed in a closed circuit structure. In addition, as described above, the pressure valve 223a of the second brake device 223 is formed as a normally closed valve. Accordingly, abnormal pressure may be generated in the second brake device 223 due to counter electromotive force or erroneous control of the pressure generator. Therefore, in the process of measuring the second pressure sensor 322, it is necessary to consider the abnormal pressure of the second brake device 223.

Due to the above difference, there is also a difference in the method of determining the occurrence of an offset between the first pressure sensor 321 and the second pressure sensor 322.

The offset determinator 40 determines whether an offset occurs between the first pressure sensor 321 and the second pressure sensor 322.

In the illustrated exemplary embodiment, the offset determinator 40 includes a first offset determinator 41 and a second offset determinator 42. The first offset determinator 41 and the second offset determinator 42 determine whether an offset occurs in the first pressure sensor 321 and the second pressure sensor 322, respectively.

The first offset determinator 41 includes a first control state determinator 411 which is connected to the first pressure sensor 321 to conduct electricity, and determines the pressure control state of the first brake device 222.

In the first offset determinator 41, the pressure control of the first brake device 222 is in an OFF state, and when the measurement of the first pressure sensor 321 exceeds a predetermined pressure value while the first cut valve 222c is opened, it is determined that an offset has occurred in the first pressure sensor 321.

The second offset determinator 42 includes a second control state determinator 412 which is connected to the second pressure sensor 322 to conduct electricity and determines the pressure control state of the second brake device 223.

When the second offset determinator 42 determines that an offset has occurred, the removal of the abnormal pressure in the second brake device 223 must be preceded. The second offset determinator 42 determines that an offset has occurred in the second pressure sensor 322, when the pressure control of the second brake device 223 even after the residual pressure in the second brake device 223 is removed and the second cut valve 223c is opened.

Accordingly, the offset detection performance of the second pressure sensor 322 may be further improved, and the offset detection reliability may be further increased.

The more detailed description of the offset generation determination process of the offset determinator 40 will be provided below.

When the offset determinator 40 determines that an offset of the first pressure sensor 321 or the second pressure sensor 322 has occurred, the offset response device 50 transmits an instruction and a control signal for offset response to brake devices 222, 223 corresponding to the pressure sensor 32 in which the offset has occurred.

The offset response device 50 is energably connected to the pressure sensor 32 and the offset determinator 40, respectively, to receive an offset generation signal from the offset determinator 40, and transmit a response instruction and control signal to the pressure sensor 32.

In the illustrated exemplary embodiment, the offset response device 50 includes a feedback pressure calculator 51 and a fall-back conversion device 52.

The feedback pressure calculator 51 calculates the feedback pressure of the brake device based on the estimated internal pressure of the brake device.

In an exemplary embodiment, the feedback pressure calculator 51 calculates the feedback pressure of the brake device based on the internal pressure value of the brake device estimated by the motor position sensor 31.

After it is determined that an offset of the pressure sensor 32 has occurred, the fall-back conversion device 52 converts the pressure sensor 32 in which the offset has occurred to a fall-back state and outputs to the outside. For example, the fall-back conversion device 52 may guide the driver of the fall-back state through a visual signal or an auditory signal.

In an exemplary embodiment, when an offset has occurred in the first pressure sensor 321, the pressure of the first brake device 222 is controlled by the feedback pressure derived from the feedback pressure calculator 51. In the above exemplary embodiment, when the normal operation of the motor position sensor 31 is impossible, the second brake device 223 performs vehicle braking.

In another exemplary embodiment, when an offset has occurred in the first pressure sensor 321, the offset response device 50 immediately switches the vehicle's braking performance subject to the second brake device 223.

In still another exemplary embodiment, when an offset has occurred in the second pressure sensor 322, the fall-back conversion device 52 switches the second pressure sensor 322 to a fall-back state and outputs to the outside.

In the above, each component of the vehicle braking system 1 has been described. Hereinafter, the offset determination process of the pressure sensor 32 included in the vehicle braking system 1 will be described with reference to FIGS. 6 to 7.

Figure 6:
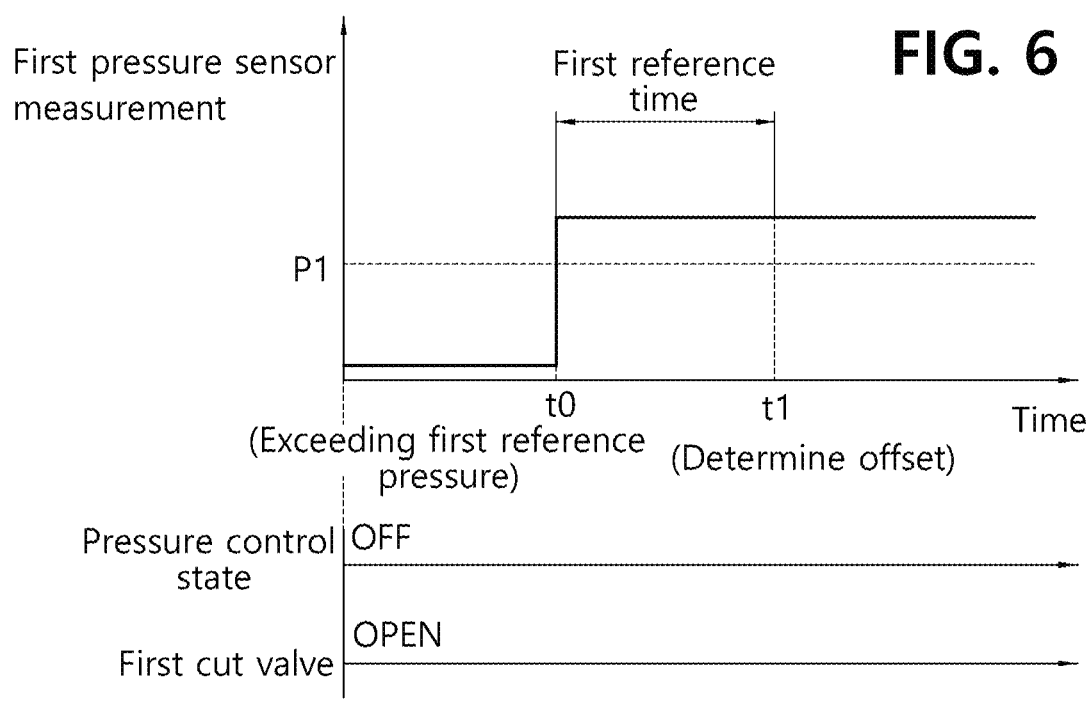
FIG. 6 is a conceptual diagram illustrating the offset determination process of a first offset determinator included in the offset determinator of FIG. 5.

FIG. 6 illustrates a process in which the first offset determinator 41 determines whether an offset has occurred in the first pressure sensor 321.

The first offset determinator 41 may determine that the input or release determinator of the brake pedal is not required, and when the pressure control of the first brake device 222 is in an OFF state, it may be determined that there is no pressure.

The determination of the offset occurrence of the first pressure sensor 321 is based on the assumption that the pressure control of the first brake device 222 is in an OFF state and the first cut valve 222c is in an open state.

A time point at which the measurement of the first pressure sensor 321 exceeds a first reference pressure (P1) is referred to as t=t0. Afterwards, when the state in which the measurement of the first pressure sensor 321 exceeds the first reference pressure (P1) is maintained even after t=t1, the first offset determinator 41 determines that an offset has occurred in the first pressure sensor 321.

When a time from t=t0 to t=t1 is a first reference time, the first reference time may be changed according to the operating condition of the vehicle braking system 1.

In an exemplary embodiment, the first reference pressure (P1) is 15 bar, and the first reference time is 1 sec.

In summary, the first offset determinator 41 does not require whether the brake pedal is braked when the first pressure sensor 321 determines that an offset has occurred. Accordingly, the offset of the first pressure sensor 321 may be detected regardless of whether the brake pedal is provided.

Figure 7:
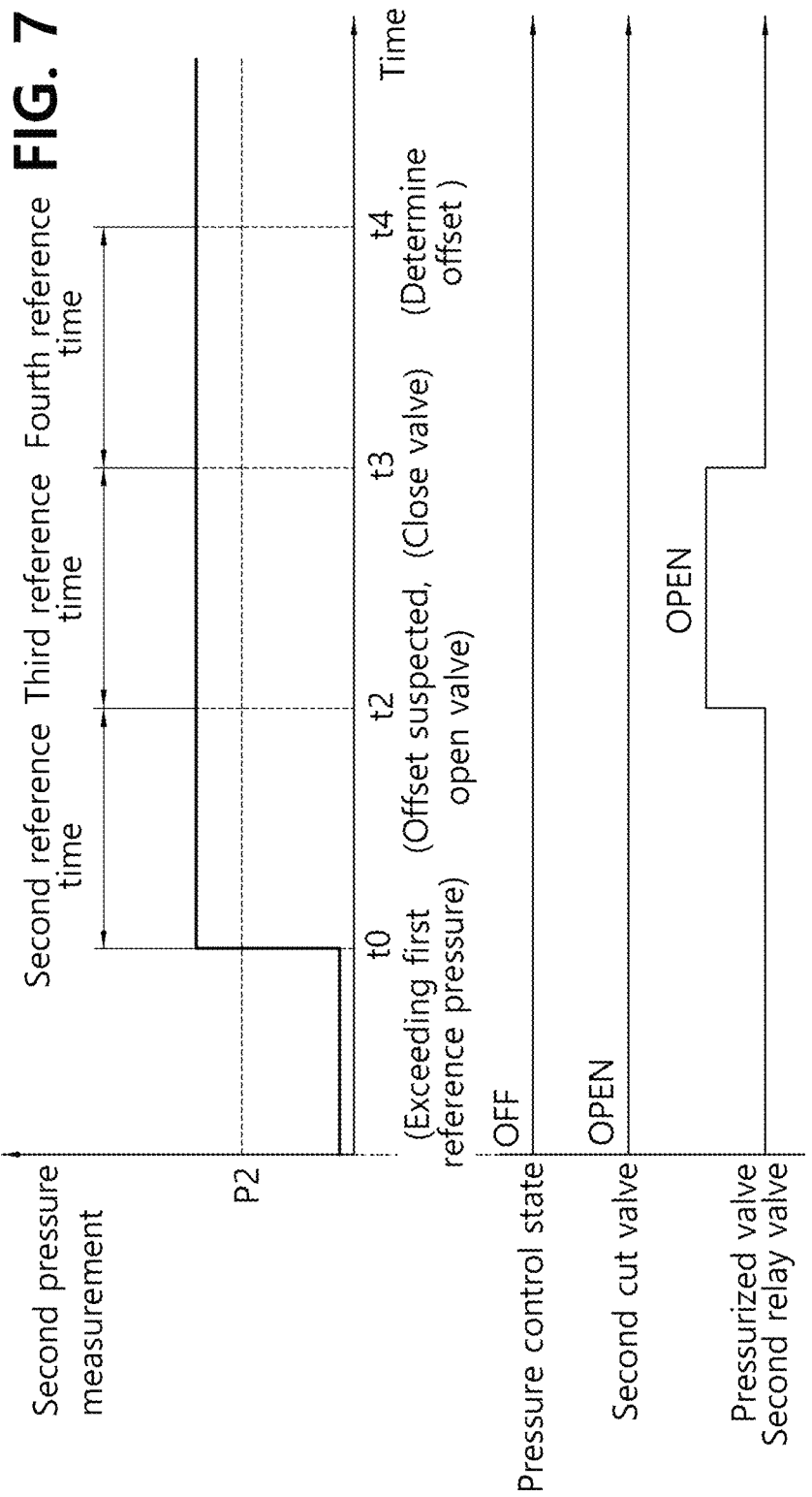
FIG. 7 is a conceptual diagram illustrating the offset determination process of a second offset determinator included in the offset determinator of FIG. 5.
Figure 8:
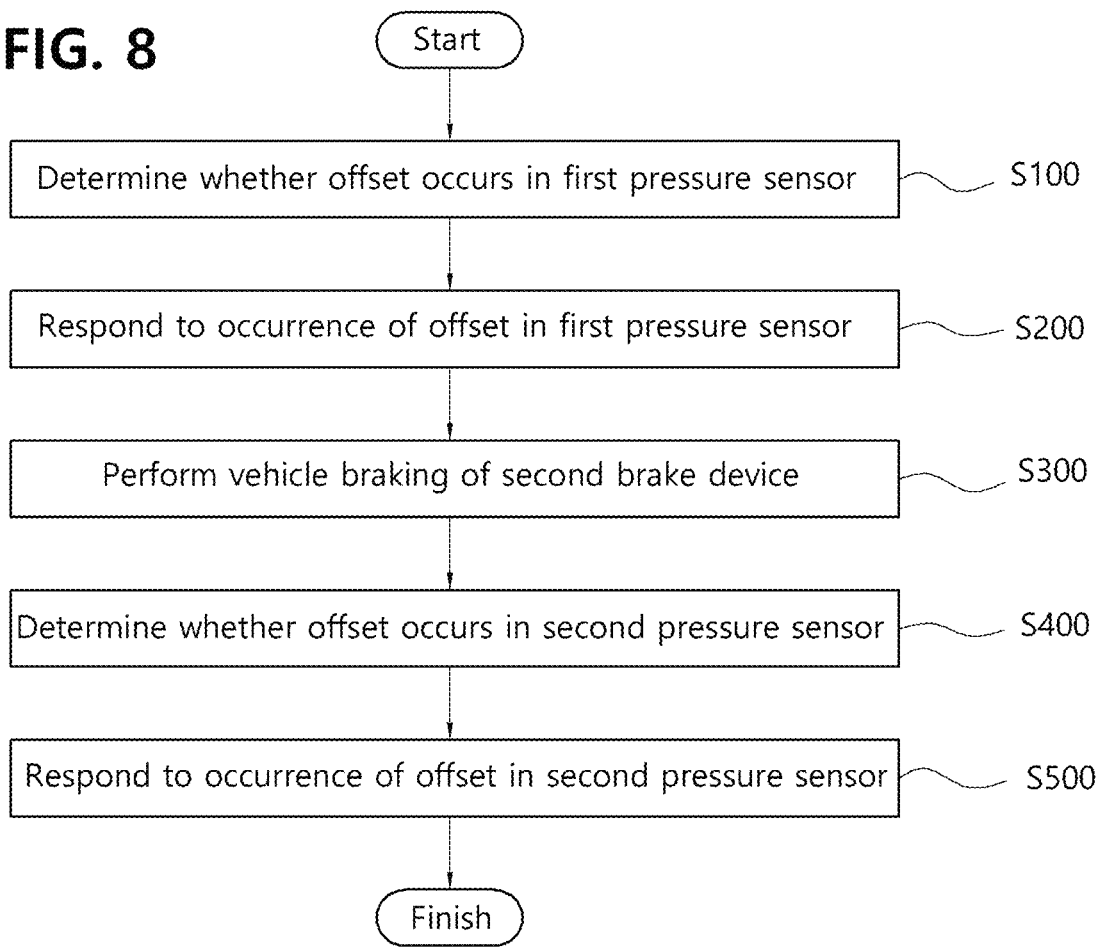
FIG. 8 is a flowchart illustrating the method for controlling a vehicle driving system according to an exemplary embodiment of the present disclosure.
Figure 9:
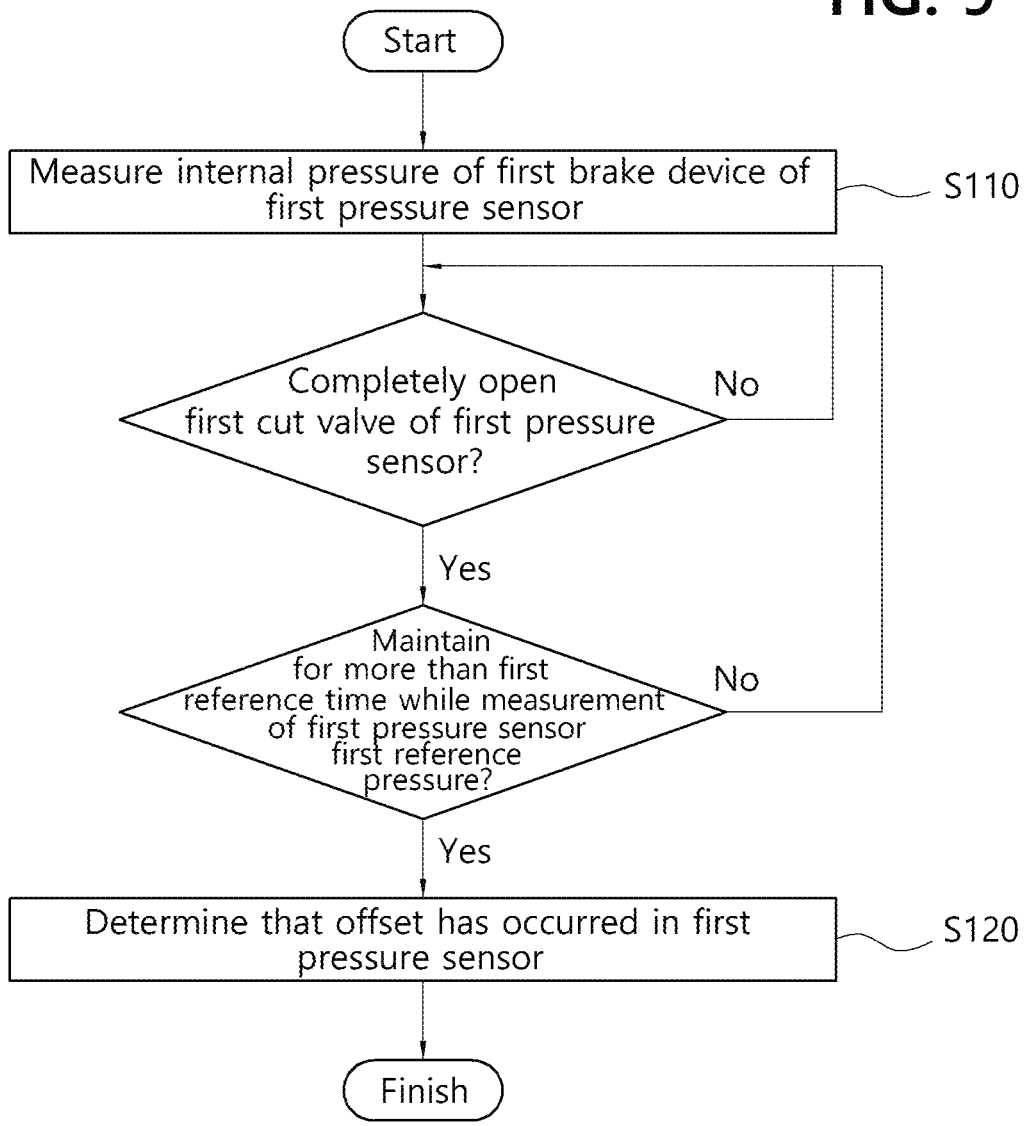
FIG. 9 is a flowchart illustrating specific steps of S100 of FIG. 8.
Figure 10:
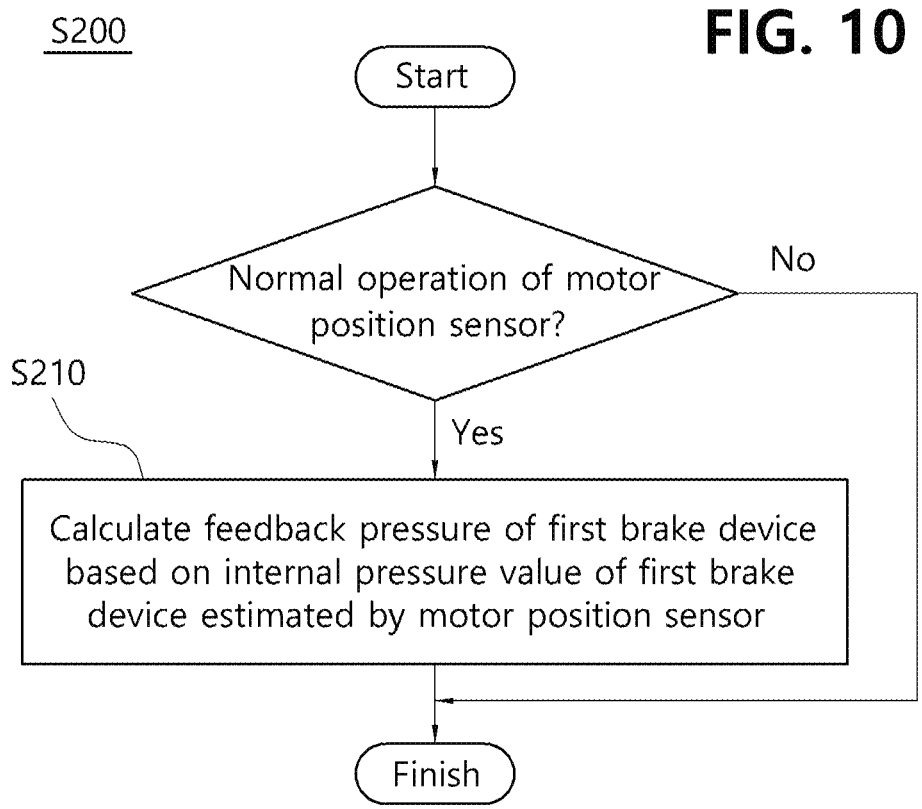
FIG. 10 is a flowchart illustrating specific steps of S200 of FIG. 8.
Figure 11:
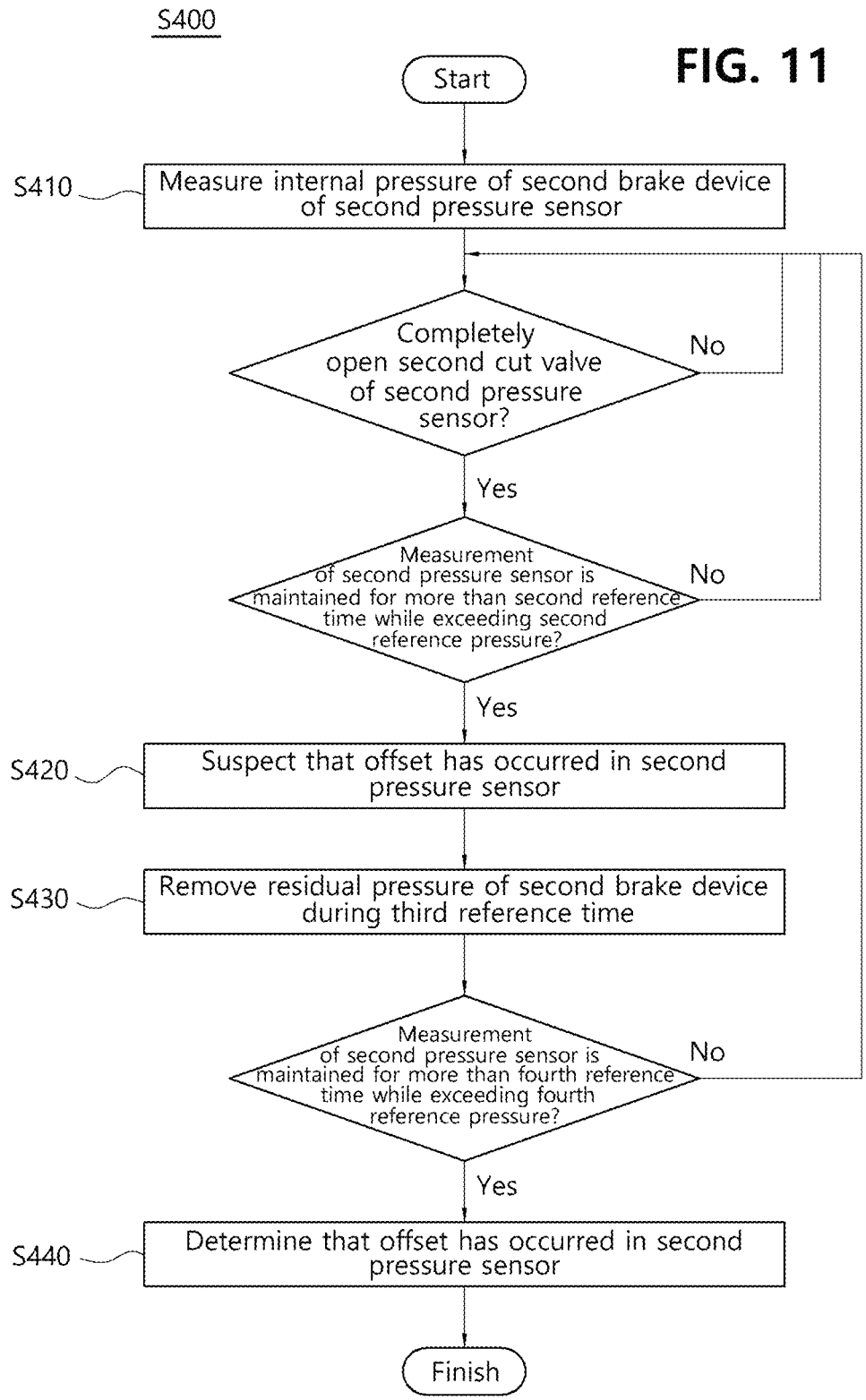
FIG. 11 is a flowchart illustrating specific steps of S400 of FIG. 8.

Hereinafter, the process in which the second offset determinator 42 determines whether an offset has occurred in the second pressure sensor 322 will be described with reference to FIG. 7.

Similar to the first offset determinator 41, the second offset determinator 42 also does not require the input or release determinator of the brake pedal, and the determination of the occurrence of the offset by the second pressure sensor 322 is premised that the pressure control of the second brake device 223 is in an OFF state and the second cut valve 223c is in an open state.

A time point at which the measurement of the second pressure sensor 322 exceeds a second reference pressure (P2) is referred to as t=t0. Afterwards, when the state in which the measurement of the second pressure sensor 322 exceeds the second reference pressure (P2) is maintained even after t=t2, the second offset determinator 42 determines that it is suspicious that an offset of the second pressure sensor 322 has occurred.

The second offset determinator 42 removes the internal residual pressure of the second brake device 223 until t=t3 is reached, when the occurrence of the offset of the second pressure sensor 322 is suspected. In this case, the residual pressure of the second brake device 223 may be removed as the pressure valve 223a and the second relay valve 223b are opened.

Thereafter, when the state in which the measurement of the second pressure sensor 322 exceeds a fourth reference pressure is maintained even after reaching t=t4, it is determined that an offset has occurred in the second pressure sensor 322.

When the time from t=t0 to t=t2, the time from t=t2 to t=t3, and the time from t=t3 to t=t4 are respectively referred to as second, third and fourth reference times, the second, the third and fourth reference times may be changed according to the operating condition of the vehicle braking system 1.

In an exemplary embodiment, the second reference pressure and the fourth reference pressure may be set to be the same. For example, both of the second and fourth reference pressures may be set to 15 bar.

In another exemplary embodiment, the second, third and fourth reference times may be set to be the same. For example, all of the second, third and fourth reference times may be set to 1 sec.

As described above, the vehicle braking system 1 according to an exemplary embodiment of the present disclosure has been described. Hereinafter, the method for controlling the vehicle braking system 1 will be described with reference to FIGS. 8 to 11.

The method for controlling the vehicle braking system 1 according to an exemplary embodiment of the present disclosure includes the steps of determining whether an offset of the first pressure sensor 321 has occurred (S100), responding to the occurrence of the offset of the first pressure sensor 321 (S200), performing vehicle braking by the second brake device 223 (S300), determining whether an offset of the second pressure sensor 322 has occurred (S400), and responding to the occurrence of the offset of the second pressure sensor 322 (S500).

First, the step (S100) of determining whether an offset of the first pressure sensor 321 has occurred will be described.

The step (S100) of determining whether an offset of the first pressure sensor 321 has occurred includes the steps of measuring the internal pressure of the first brake device 222 by the first pressure sensor 321 (S110) and determining that an offset has occurred in the first pressure sensor 321 (S120).

After the step (S110) of measuring the internal pressure of the first brake device 222 by the first pressure sensor 321, when the state where the measurement of the first pressure sensor 431 exceeds a first reference pressure is maintained for more than a first reference time while the first cut valve 222c of the first pressure sensor is opened, the step (S120) of determining that an offset has occurred in the first pressure sensor 321 is performed.

Conversely, when the first cut valve 222c of the first pressure sensor 321 is not in an open state, or the state where the measurement of the first pressure sensor 321 exceeds the first reference pressure for more than the first reference time is not maintained, the step (S120) of determining that the offset has occurred in the first pressure sensor 321 is not performed.

Thereafter, when the first cut valve 222c of the first pressure sensor 321 is opened and until the state where the measurement value of the first pressure sensor 321 exceeds the first reference pressure is maintained for more than a first reference, the above process is repeated.

When it is determined that an offset of the first pressure sensor 321 has occurred, the step (S200) of responding to the occurrence of the offset of the first pressure sensor 321 is performed.

When the motor position sensor 31 operates normally, the step (S210) of calculating the feedback pressure of the first brake device 222 based on the internal pressure value of the first brake device 222 estimated by the motor position sensor 31 is performed.

Conversely, when the motor position sensor 31 does not operate normally, the step (S200) of responding to the occurrence of the offset of the first pressure sensor 321 is terminated, and the second brake device 223 immediately performs the step (S300) of performing vehicle braking and the step (S400) of determining whether an offset of the second pressure sensor 322 has occurred.

The step (S400) of determining whether an offset of the second pressure sensor 322 has occurred includes the step (S410) of measuring the internal pressure of the second brake device 223 by the second pressure sensor, the step (S420) of suspecting that an offset has occurred in the second pressure sensor, the step (S430) of removing the residual pressure of the second brake device 223 for a third reference time and the step (S440) of determining that an offset has occurred in the second pressure sensor 322.

After the step (S410) of measuring the internal pressure of the second brake device 223 by the second pressure sensor, when the state where the measurement of the second pressure sensor 322 exceeds a second reference pressure is maintained for more than a second reference time while the second cut valve 223c of the second pressure sensor is opened, the step (S420) of suspecting that an offset has occurred in the second pressure sensor 322 is performed.

Conversely, when the second cut valve 223c of the second pressure sensor 322 is not in an open state, or the state where the measurement of the second pressure sensor 322 exceeds the second reference pressure for more than a second reference time is not maintained, the step (S420) of suspecting that an offset has occurred in the second pressure sensor 322 is not performed.

Thereafter, when the second cut valve 223c of the second pressure sensor 322 is opened and until the state where the measurement value of the second pressure sensor 322 exceeds the second reference pressure is maintained for more than a second reference, the above process is repeated.

When the occurrence of the offset of the second pressure sensor 322 is suspected, the step (S430) of removing the residual pressure of the second brake device 223 for a third reference time is performed.

After the step (S430) of removing the residual pressure of the second brake device 223 for the third reference time is completed, when the state where the measurement of the second pressure sensor 322 exceeds a fourth reference pressure is maintained for more than a fourth reference time, the step (S440) of determining that an offset has occurred in the second pressure sensor 322 is performed.

Conversely, when the state where the measurement of the second pressure sensor 322 exceeds the fourth reference pressure is not maintained for more than a fourth reference time, the step (S440) of determining that an offset has occurred in the second pressure sensor 322 is not performed. In this case, the second pressure sensor 322 returns to immediately after the step (S410) of measuring the internal pressure of the second brake device 223 and repeats the subsequent process.

When it is determined that an offset of the second pressure sensor 322 has occurred, the step (S500) of responding to the occurrence of the offset of the second pressure sensor 322 is performed. In an exemplary embodiment, when it is determined that an offset of the second pressure sensor 322 has occurred, the fall-back conversion device 52 of the offset response device 50 switches the second pressure sensor 322 to a fall-back state and outputs to the outside.

Although the above has been described with reference to the preferred exemplary embodiments of the present disclosure, the present disclosure is not limited to the configuration of the above-described exemplary embodiments.

In addition, the present disclosure may be variously modified and changed by those of ordinary skill in the art to which the present disclosure pertains without departing from the spirit and scope of the present disclosure as set forth in the claims below.

Furthermore, the exemplary embodiments may be configured by selectively combining all or part of each exemplary embodiment so that various modifications may be made.

1: Vehicle braking system
10: Control device
11: Motor control device
12: Brake control device
20: Driving device
21: Motor
22: Brake device
221: Brake fluid reservoir
222: First brake device
222a: Flow control valve
222b: First relay valve
222c: First cut valve
223: Second brake device
223a: Apply valve
223b: Second relay valve
223c: Second cut valve
30: Sensor device
31: Motor position sensor (MPS)
32: Pressure sensor
321: First pressure sensor
322: Second pressure sensor
40: Offset determinator
41: First offset determinator
411: First control state determinator
42: Second offset determinator
421: Second control state determinator
50: Offset correspondence portion
51: Feedback pressure calculator
52: Fall-back conversion device
2: Wheel

The invention claimed is:

1. A vehicle braking system which is a braking system for a fully autonomous vehicle, comprising:
a first brake device configured to control a brake hydraulic pressure transmitted to a wheel cylinder;
a first pressure sensor configured to measure a first internal pressure of the first brake device; and
a first offset determinator configured to determine that a first offset has occurred in the first pressure sensor by determining whether the first internal pressure remains above a first reference pressure for more than a first reference time, and
a first cut valve configured to allow the first internal pressure, whether existing or capable of being generated by pressure generator, to move to a brake fluid reservoir,
wherein the first cut valve is further configured to open when the pressure control of the first brake device is in an OFF state, and
wherein the first offset determinator is further configured to determine the first offset when the pressure control of the first brake device is in the OFF state.

2. The vehicle braking system of claim 1, further comprising:

an offset response device configured to transmit an instruction and a control signal for offset response to the first brake device when the first offset determinator determines the first offset.

3. The vehicle braking system of claim 2, wherein the offset response device comprises a feedback pressure calculator configured to calculate a feedback pressure of the first brake device based on a second internal pressure after the first offset determinator determines the first offset, the second internal pressure being an estimated internal pressure of the first brake device.

4. The vehicle braking system of claim 3, wherein the feedback pressure calculator is configured to calculate the feedback pressure based on the second internal pressure, the second internal pressure being estimated using a motor position sensor.

5. The vehicle braking system of claim 4, further comprising:
    a second brake device configured to perform vehicle braking when the normal operation of the motor position sensor is impossible,
    wherein the second brake device comprises a second cut valve configured to control a brake hydraulic pressure transmitted to a wheel cylinder.

6. The vehicle braking system of claim 1, further comprising:
    a second brake device configured to perform vehicle braking when the first offset is determined by the first offset determinator.

7. The vehicle braking system of claim 1, further comprising:
    a second brake device configured to perform vehicle braking either as an alternative to or as an auxiliary to the first brake device,
    a second pressure sensor configured to measure a third internal pressure, the third internal pressure is an internal pressure of the second brake device;
    a second offset determinator configured to determine that a second offset has occurred in the third pressure sensor; and
    a second cut valve configured to allow the third internal pressure, whether existing or capable of being generated by pressure generator, to move to the brake fluid reservoir;
    wherein the second cut valve is further configured to open when the pressure control of the second brake device is in an OFF state, and
    wherein the second offset determinator is further configured to determine the second offset when the pressure control of the second brake device is in the OFF state.

8. The vehicle braking system of claim 7, wherein the second brake device is further configured to open a second relay valve to remove a residual pressure, when the second cut valve is opened and the third internal pressure remains above a second reference pressure for more than a second reference time, and
    wherein the second offset determinator is configured to determine whether the second offset of the second pressure sensor has occurred after the residual pressure of the second brake device is removed.

9. The vehicle braking system of claim 8, wherein the second offset determinator is configured to determine that the second offset has occurred in the second pressure sensor when the residual pressure of the second brake device is removed for a third reference time, and the third internal pressure remains above a fourth reference pressure for more than a fourth reference time.

10. The vehicle braking system of claim 9, wherein the second reference pressure and the fourth reference pressure are the same.

11. The vehicle braking system of claim 9, wherein the second reference time and the fourth reference time are the same.

12. The vehicle braking system of claim 9, further comprising a fall-back conversion device configured to convert the second pressure sensor to a fall-back state and outputs to the outside, after the second offset determinator determines that the second offset has occurred in the second pressure sensor.

13. A method for controlling a vehicle braking system, the method being for controlling a braking system for a fully autonomous vehicle, comprising:
    opening the first cut valve when the pressure control of a first brake device is in an OFF state;
    allowing a first internal pressure, whether existing or capable of being generated by pressure generator, to move to a brake fluid reservoir;
    measuring the first internal pressure of a first brake device using a first pressure sensor; and
    determining, by a first offset determinator, that a first offset has occurred in the first pressure sensor when the first cut valve of the first brake device is opened and the first internal pressure remains above a first reference pressure for more than a first reference time;
    wherein the determining of the first offset is performed when the pressure control of the first brake device is in the OFF state.

14. The method of claim 13, further comprising calculating a feedback pressure of the first brake device based on a second internal pressure, the second internal pressure being estimated using a motor position sensor.

15. The method of claim 13, further comprising:
    determining, by a second offset determinator, that a second offset has occurred in a second pressure sensor, the second pressure sensor is configured to measure a third internal pressure of a second brake device; and
    converting the second pressure sensor to a fall-back state by a fall-back conversion device.

16. The method of claim 15, wherein the determining of the second offset comprises:
    opening a second cut valve of the second brake device;
    measuring the third internal pressure;
    determining whether the third internal pressure remains above a second reference pressure for more than a second reference time;
    removing a residual pressure of the second brake device for a third reference time; and
    determining, by the second offset determinator, that the second offset has occurred in the second pressure sensor, when the second cut valve is opened and the third internal pressure remains above fourth reference pressure for more than a fourth reference time.

* * * * *